UNITED STATES PATENT OFFICE 2,475,053

TREATMENT OF SYNTHETIC RUBBER LATICES

John S. Rumbold, Woodbridge, Conn., assignor to United States Rubber Company, New York, N. Y., a corporation of New Jersey No Drawing. Application July 1, 1944, Serial No. 543,199

7 Claims. (Cl. 260—83.3)

This invention relates to the treatment of synthetic rubber latices, more particularly to increasing the stability and reducing the viscosity of synthetic rubber latices.

According to the present invention, there is incorporated in a synthetic rubber latex an ammonium or substituted ammonium salt that can be volatilized from aqueous solution. Such treatment introduces no material in the latex that will leave an undesirable residue in a dried film of the latex. The salt may be added as such to the synthetic rubber latex, or formed in situ therein. Examples of such salts are ammonium salts, for example ammonium carbonate, bicarbonate, formate, nitrite, carbamate, hydrosulfide; amine salts, such as dimethylammonium formate, diethylammonium carbonate; morpholine salts, such as morpholine carbonate. The incorporation of such ammonium and substituted ammonium salts of volatile acids increases the average particle size of the dispersed particles of synthetic rubber, and this has been found to reduce the viscosity and increase the stability of the latex. The aggregation of the synthetic rubber particles should not be permitted to go far enough to cause flocculation or coagulation of the body of the latex, although a small amount of macroscopic particles of aggregates may be formed. The addition of the requisite amount of salt has the visible effect, in synthetic rubber latices in which the average particle diameter is within the range of approximately .03 to 0.2 micron, of materially increasing the opacity of the latex due to aggregation of the dispersed particles of synthetic rubber, but the aggregation of the particles or increase in the average particle size should not be permitted to go far enough to form any substantial amount of macroscopic flocs in the latex. The formation of not more than 5% of the latex solids into macroscopic flocs will not be detrimental to further use of the latex. Such amounts of separated macroscopic flocs are often found on storage of natural and synthetic rubber latices. They may be readily filtered out if desired. With synthetic rubber latices having an average particle diameter greater than .2 micron, the increase in opacity is less marked due to the original whiteness of the initial latex, as compared to the translucent appearance of the latices of lower average particle diameter. The exact proportion of such salt to be added cannot be given in ranges of figures, since it is obvious that various amounts of the salt may be used under different conditions and with different synthetic rubber latices and different salts. However, for any salt, and under the conditions existent in any given synthetic rubber latex, the amounts of a salt which will substantially increase the average particle size without forming any substantial amount of macroscopic flocs can readily be determined empirically. The synthetic rubber latex to which the ammonium or substituted ammonium salt of a volatile acid has been added may be fabricated into articles by known processes, such as molding, spreading, dipping, impregnating and the like, and the added volatile salt will be removed in the final drying operation. The removal of such volatile salt during a final drying operation, or the evolution of gas by virtue of the decomposition of such a salt in the latex on treatment with an acidic material as in a coagulating operation, may impart an undesired porosity to the final product. This makes it very desirable to remove the salt from the latex after the average particle size has been increased and before fabricating. The volatile salt may readily be physically removed from the synthetic rubber latex as by passing steam through the latex, as in the operation of steam distillation, which may be carried out at ordinary pressure or under reduced pressure, or by passing air, or an inert gas, such as nitrogen, through the latex at ordinary or elevated temperature under atmospheric or reduced pressure, or by vacuum distillation.

In the preparation of the synthetic rubber latex, as is known, polymerizable monomeric compounds are emulsified in an aqueous medium by means of an emulsifying agent, such as a soap or other surface active agent, and the polymerization is made to take place generally at elevated temperatures in the presence of a catalyst and other regulating materials. The monomeric compounds do not completely polymerize, and after the desired amount of polymerization has taken place, the unreacted monomers are removed from the synthetic rubber latex, as by venting off gaseous monomers and steam distilling liquid monomers. The ammonium or substituted ammonium salt according to the present invention may be added to the latex after formation and before removal of the unreacted monomers, and thereafter the salt may be removed from the latex with unreacted monomeric material to give the present improved latex. Examples of such polymerizable material are the various butadienes-1,3, for example, butadiene-1,3, methyl-2-butadiene-1,3 (isoprene), chloro-2-butadiene-1,3 (chloroprene), piperylene, 2,3-dimethyl-butadiene-1,3. The polymerizable material as known may be a mixture of such butadienes-1,3 with other polymerizable compounds which are capable of forming copolymers with butadienes-1,3, for example, compounds which contain a $CH_2=C<$ group where at least one of the disconnected valences is attached to an electro-active group, that is, a group which substantially increases the electrical dissymmetry or polar character of the molecule. Examples of compounds which contain a $CH_2=C<$ group and are copolymerizable with butadienes-1,3 are aryl olefins, such as styrene, and vinyl naphthalene, the alpha methylene carboxylic acids, and their esters, nitriles and amides, such as acrylic acid, methyl acrylate, methyl methacrylate, acrylonitrile, methacrylonitrile, methacrylamide; iso-butylene; methyl vinyl ether; methyl vinyl ketone; vinylidene chloride. Present day commercial synthetic rubbers of the above types are polymerized chloro-2-butadiene-1,3, known as neoprene or GRM rubber, copolymers of butadiene-1,3 and styrene, known as Buna S or GRS rubber, and copolymers of butadiene-1,3 and acrylonitrile, known as Buna N or GRN rubber.

The following examples are illustrative of the present invention:

*Example I*

A Buna S latex was prepared by polymerizing an aqueous emulsion of equal parts by weight of butadiene-1,3 and styrene with 3½% potassium abietate based on the weight of the polymerizable material as an emulsifying agent, for 20½ hours at 65° C., after which unreacted butadiene-1,3 and styrene were removed from the emulsion polymerizate in the usual manner. The solids content of the final Buna S latex was 30% and the pH 8.4. When rubbed or pressed between the fingers, it coagulated immediately. It was also quite unstable to frictional force as applied by high speed stirring. As there is at present no quantitative test for mechanical stability of synthetic latices, a qualitative test is used wherein a portion of the latex is rubbed or pressed between the fingers or rubbed on the palm of the hand, and in this way the relative time in which coagulation takes place gives a qualitative indication of the relative mechanical stability of various latices. 0.25% ammonia based on the total latex weight was added to the latex and carbon dioxide was bubbled through, forming ammonium carbonate in situ, until the pH fell to 7.1. This caused a material increase in the opacity of the latex, the latex changing from a cloudy liquid to a milky white body having the appearance of natural rubber latex. Wet films of the latex before this treatment had a translucent appearance, while after the treatment thin layers were opaque. The thus treated latex was steam distilled at ordinary pressure until substantially all the ammonium carbonate was driven off. Most of the water that was added by condensation of the steam during the steam distillation was removed by vacuum distillation, leaving a latex of about 29% solids content and with a pH of 8.8. Tests on the thus treated latex as by rubbing in the palm of the hand and testing in a high speed stirrer showed a greatly increased mechanical stability, comparable to that obtained by the addition to the latex of further soap or other stabilizing agents.

*Example II*

A Buna S latex was prepared by polymerizing an aqueous emulsion of 75 parts by weight of butadiene-1,3 and 25 parts by weight of styrene with 2½% of fatty acid soap based on the weight of the polymerizable material as an emulsifying agent, for 38 hours at 65° C., after which unreacted butadiene-1,3 and styrene were removed from the emulsion polymerizate in the usual manner. The solids content of the final Buna S latex was 30%.

To 100 parts by weight of the latex was added 2.2 parts by weight of 27½% aqueous ammonia solution, and the latex was further stabilized by the addition of 1 part by weight of 25% aqueous dimethylamine solution and 3 parts by weight of a 25% aqueous solution of the dimethyl-ammonium salts of coconut-oil fatty acids (control portion).

To a second portion of 100 parts by weight of the latex was added 2.2 parts by weight of 27½% aqueous ammonia solution, as in the control, and carbon dioxide was then passed through to saturation. The latex was then further stabilized, as in the control, by the addition of 1 part by weight of 25% aqueous dimethylamine solution and 3 parts by weight of a 25% aqueous solution of the dimethylammonium salts of coconut-oil fatty acids.

A third portion was treated as in the second portion with the additional final step of steam distilling to completely remove the volatile-base carbonates. A quantity of water equal to the condensed water from the steam distillation was evaporated under low pressure, and a small amount of ammonia was added to replace the alkaline materials lost in the distillation.

All three portions above were adjusted to a total solids content of 28%. The control had a greyish, translucent appearance, whereas the second and third treated portions were white and opaque but without macroscopic flocs. The second portion had a greater-stability against friction by the hand rubbing test than the control, and the third portion had a greater stability than the second. The viscosities of the three portions in centipoises were 4.75 for the control, 3.98 for the second portion, and 3.50 for the third portion.

*Example III*

In this case, a commercial 38% solids content aqueous emulsion polymerizate of a mixture of butadiene-1,3 and acrylic nitrile or Buna N latex, sold under the trade name Hycar-OR latex, was used. A solution of volatile carbonate containing 20% carbon dioxide was made by dissolving 360 parts by weight of ammonium bicarbonate in 640 parts by weight of a 25% solution of dimethylamine. To 100 parts by weight of the Hycar-OR latex was added 5 parts by weight of the above carbonate solution. To 100 parts by weight of the Hycar-OR latex was added 5 parts of water as a control. The viscosity of the control was 4.59 whereas the viscosity of the latex containing the carbonate was 3.74 (measured at 24° C.). The carbonate treated portion was white and more opaque than the control, and was more stable against friction.

The control and carbonate treated portions were heated to about 80° C. and steam was blown through both for a few minutes to drive off at least some of the added carbonate from the carbonate treated sample. 8.5 parts of water condensed in each portion. The viscosity of the steamed control was 4.01 centipoises whereas the viscosity of the steamed carbonated treated portion was 2.96 centipoises.

Example IV

In this case a commercial 50% solids aqueous emulsion polymerizate of chloro-2-butadiene-1,3, or neoprene latex, was used. The neoprene latex was further stabilized by the addition of 4% Emulphor–ON (reaction product of ethylene oxide and oleyl alcohol) based on the neoprene latex solids. A solution of volatile carbonate containing 20% carbon dioxide was made by dissolving 360 parts by weight of ammonium bicarbonate in 640 parts by weight of a 25% solution of dimethylamine.

To various portions of the neoprene latex containing the Emulphor–ON was added 5, 10 and 20 parts respectively of the carbonate solution per 100 parts of the latex. These portions and a portion containing the Emulphor–ON but without addition of carbonate solution (control) were adjusted to 41% solids content. The control had a viscosity of 4.24 centipoises. The portions to which 5 and 10 parts of carbonate solution had been added had viscosities of 3.41 and 3.56 centipoises respectively. The portion to which 20 parts of carbonate solution had been added, flocculated on standing, illustrating the addition of too large an account of the volatile carbonate.

The improved synthetic rubber latices according to the present invention may be used in manners similar to natural latex as in the direct manufacture of articles by various known methods.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A process for treating a synthetic rubber latex comprising an aqueous emulsion polymerizate of butadiene-1,3 with a compound which contains a $CH_2=C<$ group and is copolymerizable with butadiene-1,3 which comprises incorporating in the emulsion polymerizate material selected from the group consisting of ammonium and substituted ammonium salts that can be volatilized from aqueous solution whereby to increase the average particle size of the polymer particles in the dispersion without forming any substantial amount of macroscopic flocs of the polymerized material, and steam distilling the thus treated synthetic rubber latex to remove substantially all the added volatile salt therefrom.

2. A process for treating a synthetic rubber latex comprising an aqueous emulsion polymerizate of polymerizable material selected from the group consisting of butadienes-1,3 and mixtures of butadienes-1,3 with a compound which contains a $CH_2=C<$ group and is copolymerizable with butadienes-1,3 which comprises incorporating in the emulsion polymerizate material selected from the group consisting of ammonium and substituted ammonium salts that can be volatilized from aqueous solution whereby to increase the average particle size of the polymer particles in the dispersion without forming any substantial amount of macroscopic flocs of the polymerized material, and steam distilling the thus treated synthetic rubber latex to remove added volatile salt therefrom.

3. A process for treating a synthetic rubber latex comprising an aqueous emulsion polymerizate of a mixture of butadiene-1,3 and styrene which comprises incorporating in the emulsion polymerizate material selected from the group consisting of ammonium and substituted ammonium salts that can be volatilized from aqueous solution whereby to increase the average particle size of the polymer particles in the dispersion without forming any substantial amount of macroscopic flocs of the polymerized material, and steam distilling the thus treated synthetic rubber latex to remove added volatile salt therefrom.

4. A process for treating a synthetic rubber latex comprising an aqueous emulsion polymerizate of a mixture of butadiene-1,3 and acrylic nitrile which comprises incorporating in the emulsion polymerizate material selected from the group consisting of ammonium and substituted ammonium salts that can be volatilized from aqueous solution whereby to increase the average particle size of the polymer particles in the dispersion without forming any substantial amount of macroscopic flocs of the polymerized material, and steam distilling the thus treated synthetic rubber latex to remove added volatile salt therefrom.

5. A process for treating a synthetic rubber latex comprising an aqueous emulsion polymerizate of chloro-2-butadiene-1,3 which comprises incorporating in the emulsion polymerizate material selected from the group consisting of ammonium and substituted ammonium salts that can be volatilized from aqueous solution whereby to increase the average particle size of the polymer particles in the dispersion without forming any substantial amount of macroscopic flocs of the polymerized material, and steam distilling the thus treated synthetic rubber latex to remove added volatile salt therefrom.

6. A process for treating a synthetic rubber latex comprising an aqueous emulsion polymerizate of butadiene-1,3 with a compound which contains a $CH_2=C<$ group and is copolymerizable with butadiene-1,3 which comprises incorporating in the emulsion polymerizate material selected from the group consisting of ammonium and substituted ammonium salts that can be volatilized from aqueous solution whereby to increase the opacity of the dispersion of polymerized material without forming any substantial amount of macroscopic flocs of the polymerized material and to increase the stability and decrease the viscosity of said dispersion, and steam distilling the thus treated synthetic rubber latex to remove substantially all the added volatile salt therefrom whereby to further increase the stability and decrease the viscosity of the synthetic rubber latex.

7. A process for treating a synthetic rubber latex comprising an aqueous emulsion polymerizate of polymerizable material selected from the group consisting of butadienes-1,3 and mixtures of butadienes-1,3 with a compound which contains a $CH_2=C<$ group and is copolymerizable with butadienes-1,3 which comprises incorporating in the emulsion polymerizate material selected from the group consisting of ammonium and substituted ammonium salts that can be volatilized from aqueous solution whereby to increase the opacity of the dispersion of polymerized material without forming any substantial amount of macroscopic flocs of the polymerized material and to increase the stability and decrease the viscosity of said dispersion, and steam distilling the thus treated synthetic rubber latex to remove added volatile salt therefrom whereby to further increase the stability and decrease the viscosity of the synthetic rubber latex.

JOHN S. RUMBOLD.

REFERENCES CITED

The following references are of record in the file of this patent:

UNITED STATES PATENTS

| Number | Name | Date |
| --- | --- | --- |
| 2,357,861 | Willson | Sept. 12, 1944 |